United States Patent [19]

Ando

[11] Patent Number: 4,569,266

[45] Date of Patent: Feb. 11, 1986

[54] FOOD-CUTTING APPARATUS

[75] Inventor: Toshio Ando, Mie, Japan

[73] Assignee: Chubu Industries, Inc., Kuwana, Japan

[21] Appl. No.: 677,967

[22] Filed: Dec. 4, 1984

[30] Foreign Application Priority Data

Jul. 23, 1984 [JP] Japan .............................. 59-111525[U]
Aug. 24, 1984 [JP] Japan .............................. 59-128252[U]

[51] Int. Cl.4 .......................... B02C 19/00; F16D 1/00
[52] U.S. Cl. ..................... 83/411 R; 83/733;
83/DIG. 1; 241/37.5; 241/95; 241/101.2; 241/DIG. 17
[58] Field of Search ................ 241/DIG. 17, 37.5, 92, 241/95, 101.2; 83/411 R, 733, DIG. 1, 411 A

[56] References Cited

U.S. PATENT DOCUMENTS

| | | | |
|---|---|---|---|
| 1,077,482 | 11/1913 | Lippincott | 241/95 |
| 3,489,357 | 1/1970 | Takahashi | 241/95 |
| 3,952,621 | 4/1976 | Chambos | 83/733 |
| 3,985,057 | 10/1976 | Bettcher | 83/411 R |
| 4,111,372 | 9/1978 | Hicks et al. | 271/37.5 |

Primary Examiner—Donald R. Schran
Attorney, Agent, or Firm—Fulbright & Jaworski

[57] ABSTRACT

A food-cutting apparatus comprises: a longitudinal supporting frame mounted in upright position on a base; an upper frame and a cutting plate below the upper frame both of which are fixed to a front surface of the supporting frame in lateral position; a longitudinal rotary main shaft provided on the upper frame movably up and down and provided with a holding member for a work at its lower end; a worm wheel meshing with a worm formed on the main shaft; a brake ring and a handle for moving the main shaft up and down, both of which are provided on a rotary shaft of the worm wheel; a brake shoe abutting on the brake ring for controlling a rotation of the worm wheel; a cover for enclosing a cutting operation area above the cutting plate, which cover is openable horizontally; an electric motor rotatably driving the main shaft; and a main switch provided in a control circuit for the motor; which food-cutting apparatus is characterized by further comprising: a stop means having its front end engaging portion engage with the worm wheel, which stop means is so supported that the front end engaging portion is travelable between a first position where the engagement with the worm wheel is established and a second position where the engagement is resolved; and a supporting member for the stop means, which is disposed on the upper frame.

5 Claims, 17 Drawing Figures

FOOD-CUTTING APPARATUS

BACKGROUND OF THE INVENTION

1. Field of the Invention

The present invention relates to a food-cutting apparatus for solid foods such as an ice block, frozen fruits and the like.

2. Description of the Prior Art

An outline and enlarged views of parts of a conventional food-cutting apparatus are shown in FIGS. 1, 2, 3A, 3B and 3C, which apparatus will briefly be described hereinbelow with reference to the drawings in which like reference characters or numerals designate like parts, in which:

The numeral 1 designates a base on a one side of which is mounted a supporting frame 2 in an upright position, at an upper portion of which supporting frame 2 is mounted an upper frame 3 extending laterally from the supporting frame 2. Within an upper portion of the supporting frame 2 an electric motor 5 is recived. These frames 2 and 3 are covered by a head cover 4 provided thereon.

A main shaft 7 on an outer peripheral surface of which a worm is formed is rotatably mounted on a supporting member 10 provided on the upper frame 3, in an upper portion of which main shaft 7 is inserted and connected thereto a pulley 6 slidably by means of a key and the like, around which pulley 6 and another pulley 8 mounted on shaft of the electric motor 5 a belt 9 runs under tension.

To a lower end of the main shaft 7 is attached a holding member 12 below which is disposed a cutting plate 13 to which a cutting blade 11 is detachably attached. A worm wheel 15 meshing with the worm of the main shaft 7 is fixed to a rotary shaft 16 which is axially supported by a supporting member 14 provided on the upper frame 3, adjacent to which worm wheel 15 a brake ring 17 is also fixed to the rotary shaft 16. On the upper frame 3 is mounted a supporting member 18 in which a threaded hole is provided laterally, with which threaded hole a screw shaft 20 is meshed as shown in FIG. 2, in a front end portion of which screw shaft 20 is provided a blind hole into which a small-diameter supporting shaft 21 of a brake shoe 19 is inserted, around an outer periphery of which supporting shaft 21 a coil spring 22 is provided so as to wind it 21 therein, which coil spring 22 always presses the brake shoe 19 to the brake ring 17. The numeral 23 designates a main switch for actuating the motor 5. The numeral 25 designates a lower cover provided between the upper frame 3 and the cutting plate 13 for enclosing a cutting operation area, which cover 25 is formed by its rear half portion 25b attached to the supporting frame 2 by means of mounting means 26 and its front half portion 25a disposed radially in a more inward position than that of the rear half portion 25b, a lower end of which front half portion 25a is inserted in a concave groove provided in the cutting plate 13 to make oneself horizontally openable. The numeral 27 designates a manual handle fixed to an extending end of the rotary shaft 16.

In use of the above-mentioned apparatus in a condition as shown in FIG. 1, the worm wheel 15 is rotated by rotating the rotary shaft 16 through the manual handle 27 to move up the main shaft 7 so as to form a space between the holding member 12 and the cutting plate 13, then the lower cover 25 is opened to place a food in the space mentioned above, and thereafter the holding member 12 is lowered by rotating the handle 27 in reverse direction to pierce the food with holding pins 29 provided on a lower surface of the holding member 12. At this time, since a braking force adjusted by rotating a screw shaft 20 is applied to the brake ring 17 through the brake shoe 19, the handle 27 can be rotated in case that a manual driving force overcomes the braking force. As a result, it is possible to hold the holding member 12 in a position where the user stops the manual driving of the handle 27.

However, in this condition, in case that an unexpected force directed downward is applied to the main shaft 7 or the user rotates the handle 27 by mistake to lower the holding member 12, there is strong possibility that the holding pins 29 hurt the user's fingers. This is a defect in herent in the conventional food-cutting apparatus.

In cutting operation of the food with the use of the conventional apparatus, the motor 5 is actuated by turning on the main switch 23 after he closed the lower cover 25, which motor 5 rotatably drives the main shaft 7 through the pulleys 6, 8 and the belt 9. Since the worm wheel 15 is prevented from rotating by the braking force of the brake shoe 19, the main shaft 7 is lowered while rotated by the rotation of the motor 5 to press downward and rotate the food by means of the holding member 12 so as to cut the food with the use of the cutting blade 13. At this time, the food resists the downward movement of the main shaft 7, and the resultant resisting force of the food is overcome when the worm wheel 15 meshing with the worm of the main shaft 7 is rotated by the driving force of the motor 5 after such driving force overcomes the braking force of the brake shoe 19.

As for this cutting operation in the conventional apparatus, the main switch 23 is sometimes turned on in case that the lower cover 25 is still not closed completely due to the user's carelessness and also in case that the user turns the main switch 23 on by mistake, this leads to an accident such as a hit of a small block of the cut food at the worker around the apparatus and the user's injury caused by his touching the holding member 12. This is another defect inherent in the conventional food-cutting apparatus.

FIG. 3A, 3B, 3C and 3D show the details of the holding member 12. As shown in the drawings, a base plate 28 is made of plastic, in which base plate 28 the holding pins 29 are integrally embedded when the base plate 28 is molded. In an example as shown in the drawings, the total number of the holding pins 29 are eight, four of which are provided in a radially inside portion of the base plate 28 and remaining four of which are provided in a radially outside portion of the base plate 28. The total number of the holding pins 29 is not restricted to the above eight only. The reference numeral 31 designates a cover fitting to the base plate 28, in a central portion of which cover 31 is provided a threaded hole 30 with which a lower end of the main shaft 7 which forms a worm meshes. The cover 31 is fixed to the base plate 28 by means of setscrews 32 which engage with threaded holes 33.

Since the holding pins 29 are integrally embedded in the base plate 28 in such holding member 12, it is difficult to remove a food residue which is adhered to coner portions of the holding pins 29 adjacent to a back surface of the base plate 28 and to a portion between the cover 31 and the base plate 28. This is further another defect inherent in the conventional food-cutting apparatus.

SUMMARY OF THE INVENTION

Consequently, an object of the present invention is to provide a food-cutting apparatus which resolves the above-mentioned defects inherent in the conventional food-cutting apparatus, in which apparatus according to the present invention an accidental downward movement of the holding member is prevented in a time for stalling the holding member, particularly, in an upward stroke of its movement.

The present invention accomplishes the above object in that: in the same apparatus as the conventional food-cutting apparatus, a stop means has its front end engaging portion engage with a worm wheel and is so supported that the front end engaging portion is travelable between a first position where the engagement with the worm wheel is established and a second position where the engagement is resolved; and a supporting member for the stop means is disposed on the upper frame of the apparatus.

Namely, according to the present invention, when the holding member is held in a stationary position, the stop means is moved to the first position to engage with the worm wheel so as to prevent the worm wheel from rotating, whereby an up-and-down movement of the main shaft on an outer peripheral surface of which is formed a worm meshing with the worm wheel is prohibited. On the other hand, when it is necessary to move the main shaft up and down, it is realized by moving the stop means to the second position where the engagement between the stop means and the worm wheel is resolved to enable the worm wheel to rotate freely.

In embodiments of the present invention, the stop means is provided with a rod which is both rotatable and slidable in a through-hole provided in the supporting member, behind a front engaging portion of which rod a flange is formed in the rod around which a coil spring is mounted between the flange and the supporting member for biasing the rod toward the worm wheel; in one of the embodiments, which engaging portion of the rod has an inclined end surface which is directed upward or downward in the first position or the second position, in a rear portion of which rod is provided a stop pin which engages with the supporting member in the first position or the second position; in another embodiment, in a rear portion of which rod a pin is provided, which pin is inserted in a long slit formed in a sleeve provided in a back side of the supporting member to establish an engagement between the engaging portion of the rod and the worm wheel, which pin is retracted from the long slit to abut an end surface of the sleeve by rotating the rod so as to resolve the above engagement. In any of these embodiments, it is possible to easily perform an engaging operation and a disengaging operation between the stop means and the worm wheel and to steady hold the resultant condition thereof.

Another object of the present invention is to provide a food-cutting apparatus in which the electric motor is not actuated to prevent the holding member from rotating when the lower cover is open.

The above another object of the present invention is accomplished by providing at a lower end of the upper frame a sub-switch which is actuated by an opening-and-closing operation of the lower cover, which sub-switch is connected with the main switch in series in a control circuit for the electric motor. Namely, since the sub-switch is turned off by opening the lower cover, the electric motor is not actuated even if the user turns on the main switch by mistake and as a result the cutting operation is not started.

A further another object of the present invention is to provide a food-cutting apparatus in which there is no fear for causing a sanitary trouble because the food residue adhered to corner portions of the holding pins adjacent to the base plate and also adhered to a portion between the cover and the base plate can be easily removed in a easy operation.

The above object of the present invention is accomplished by the embodiments of the present invention in which the holding member is formed by a base plate, a plurality of holding pins and a cover, which base plate is provided with a plurality of through-holes in which the holding pins are inserted. Namely, when it is necessary to wash out the holding member, the holding member is first dismounted from the main shaft and thereafter disassembled into the base plate, the holding pins and the cover to enable them to be easily washed out.

DESCRIPTION OF THE PREFERRED EMBODIMENTS

Figure 1:
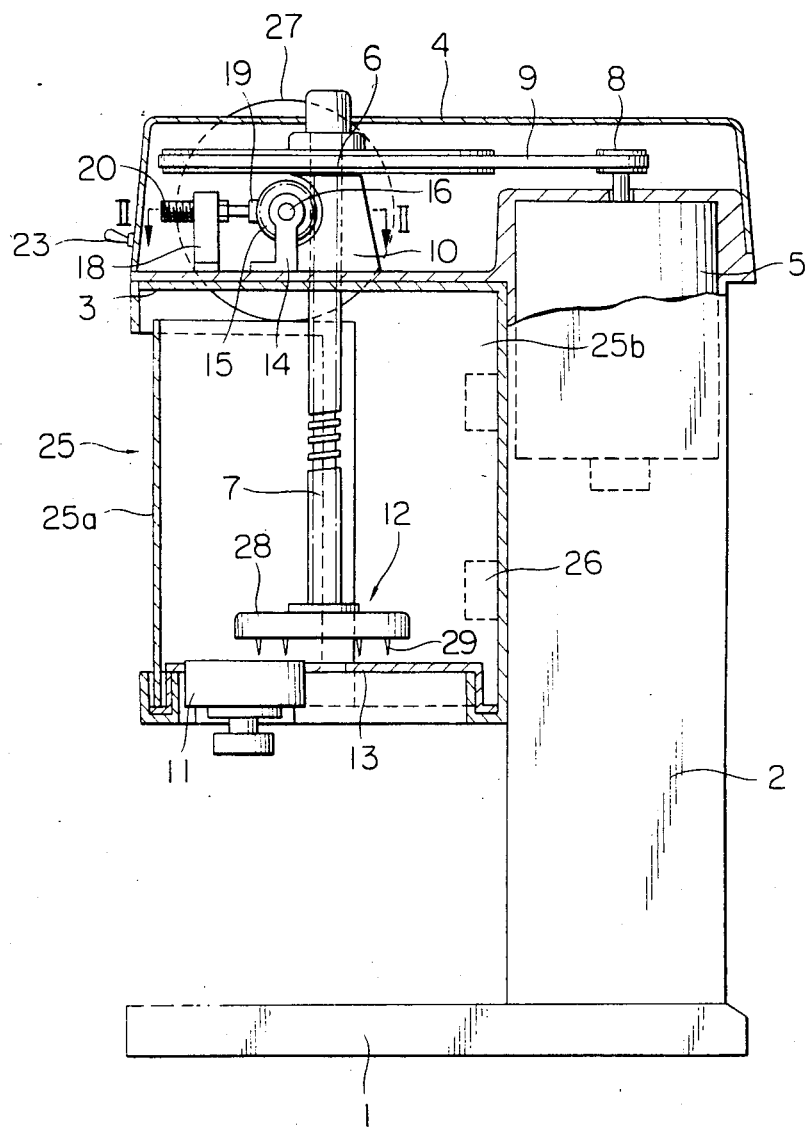
FIG. 1 is a longitudinal partial sectional view of a conventional type of food-cutting apparatus to which the present invention is to be applied.
Figure 2:
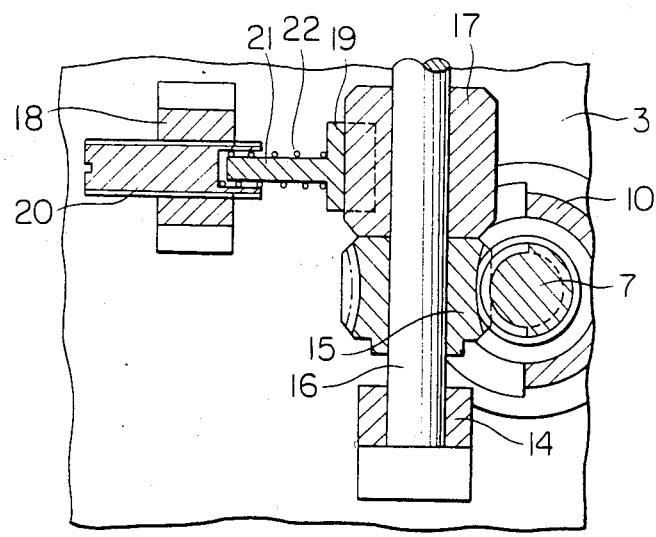
FIG. 2 is an enlarged cross-sectional view taken along the line II—II of FIG. 1.
Figure 3A:
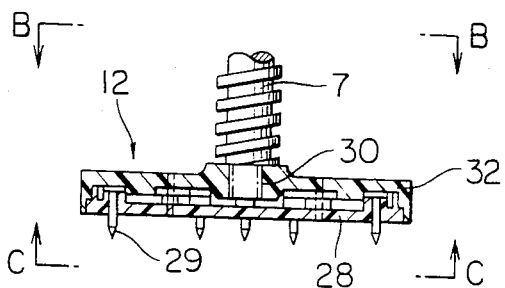
FIG. 3A is a longitudinal sectional view of the holding member of the food-cutting apparatus shown in FIG. 1.
Figure 3B:
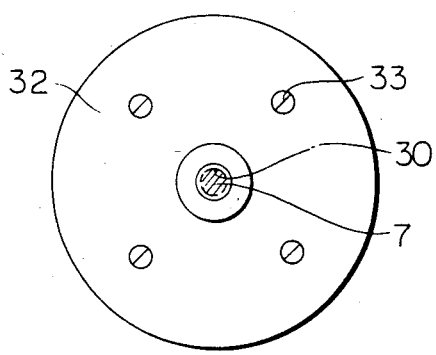
FIG. 3B is a cross-sectional view taken along the line B—B of FIG. 3A.
Figure 3C:
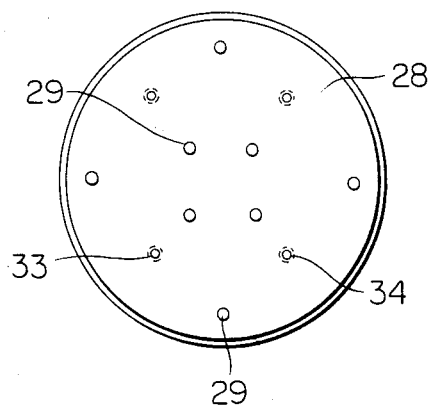
FIG. 3C is a bottom view of the holding member, taken along the line C—C of FIG. 3A.
Figure 3D:
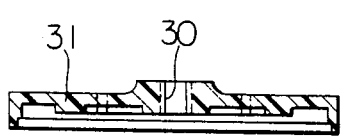
FIG. 3D is an exploded longitudinal sectional view of the holding member shown in FIG. 3A.
Figure 3D:
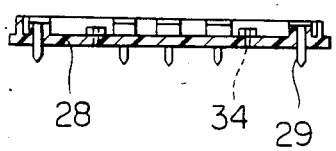
Figure 4:
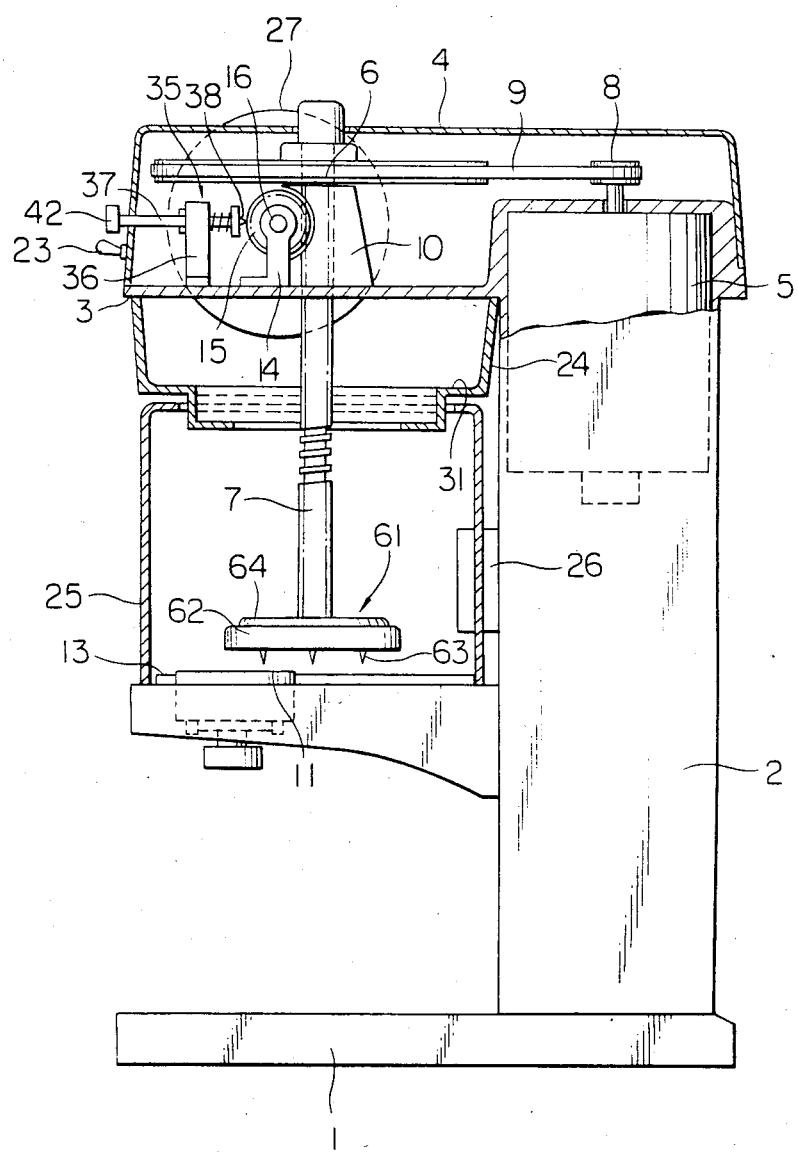
FIG. 4 is a longitudinal partial sectional view of a food-cutting apparatus of the present invention, corresponding to that of FIG. 1.

In FIGS. 4 to 12C, embodiments of a food-cutting apparatus according to the present invention are shown. In the drawings, like reference characters or numerals designate like parts as is in the conventional type of the food-cutting apparatus as already described in the above. Hereinbelow, only the constitutional elements of the apparatus of the present invention which are different from those of the conventional apparatus will be described, because the remaining constitutional elements of the apparatus of the present invention are the sames as those of the conventional apparatus described in the above.

As will hereinbelow be described, the embodiments of the present invention are different from the conventional apparatus in that they are provided with a stop means 35, 35', a sub-switch 51 and partially improved constructions of a lower cover 25 and a holding member 61 which substitutes for the conventional type of the holding member 12.

Figure 5:
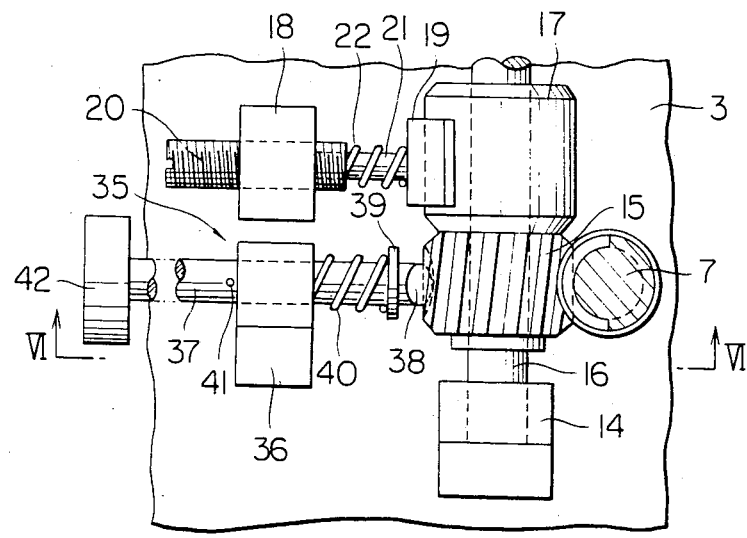
FIG. 5 is a plan view of the stop means shown in FIG. 4.
Figure 6:
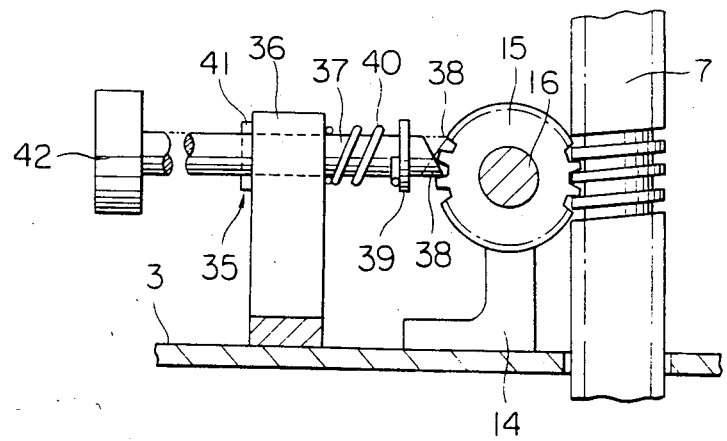
FIG. 6 is a longitudinal sectional view taken along the line VI—VI of FIG. 5.

FIGS. 5 and 6 show the details of an embodiment of the stop means 35 of the present invention. As shown in FIGS. 5 and 6, a supporting member 36 is mounted on the upper frame 3 side by side with the supporting member 18, which frame 3 and which member 18 are already described in the above item "Description of the Prior Art" with respect to the conventional apparatus. A through-hole is laterally provided in the supporting member 36, in which through-hole a rod 37 is rotatably and slidably inserted. As shown in FIG. 6, at a front end of the rod 37 an engaging portion 38 having an inclined front end surface is formed which portion 38 engages with the worm wheel 15, behind which portion 38 a flange 39 is formed. A coil spring 40 opposite ends of which engage with the flange 39 and the supporting member 36 respectively biases the rod 37 always toward the worm wheel 15. On a rear portion of the rod 37 a stop pin 41 is provided to abut on a back surface of the supporting member 36 when the engaging portion 38 engages with the worm wheel 15. At a rear end of the rod 37 a knob 42 is provided.

In FIGS. 5 and 6, a first position where the stop means 35 engages with the worm wheel 15 is shown with a solid line. In the first position, under the biasing force exerted by the spring 40, the engaging portion 38 engages with the worm wheel 15, the stop pin 41 abuts on the back surface of the supporting member 36, and these conditions are held as they are. In case that it is required to resolve these conditions, it is enough to pull the rod 37 rearward and turn the same by a half-turn with the use of the knob 42 so as to bring the engaging portion 38 to a second position shown with a chain line in FIG. 6, in which second position the engaging portion 38 is prevented from engaging with the worm wheel 15 and held by the stop pin 41 as it is.

Figure 7:
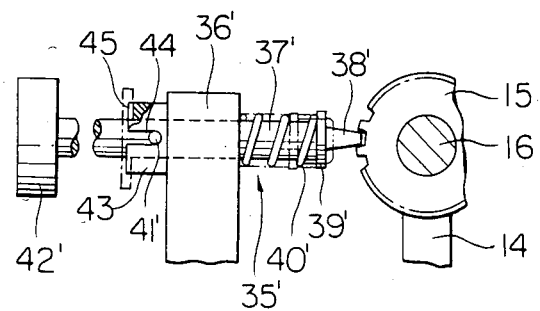
FIG. 7 is a longitudinal sectional view of a modification of the stop means shown in FIG. 5, corresponding to that of FIG. 6.

FIG. 7 shows another embodiment 35' of the stop means 35. In the stop means 35', a sleeve 43 is mounted on a rear portion of a supporting member 36' in protruding manner, in which sleeve 43 a rod 37' is slidably supported. A stop pin 41' is provided on a rear portion of the rod 37', which stop pin 41' is inserted in a long slit 44 provided in the sleeve 43. A recess 45 is formed on a rear end of the sleeve 43, which recess 45 is spaced apart from the long slit 44 by an angle of 90 degree around an axis of the sleeve 43. In this embodiment, the first position is shown with a solid line and the second position is shown with a chain line. Since the stop pin 41' is inserted in the long slit 44 when the engaging portion 38' engages with the worm wheel 15, the rod 37' is steady held in the first position. In case that it is required to move the rod 37' to the second position, it is enough to pull the rod 37' rearward and turn the same by a half-turn with the use of the knob 42' so as to insert the stop pin 41' into the recess 45 and to separate the engaging portion 38' from the worm wheel 15 as shown by a chain line. The rod 37' is steady held in the second position through the connection between the stop pin 41' and the recess 45. Incidentally, the reference numerals 39' and 40' designate a flange and a coil spring, respectively.

In FIGS. 8 to 11, the details of the lower cover 25 and the sub-switch 51 are shown.

Figure 8:
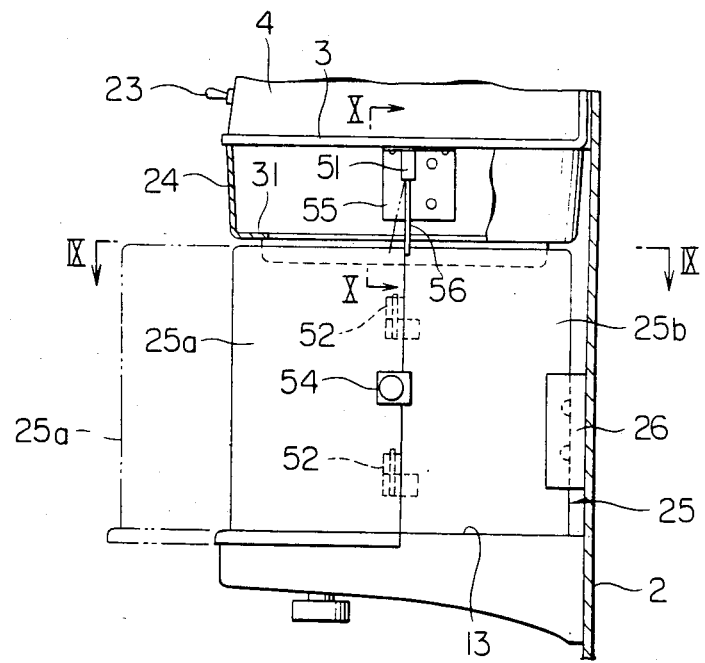
FIG. 8 is a partial sectional front view of the lower cover and the sub-switch of the apparatus of the present invention shown in FIG. 4.
Figure 9:
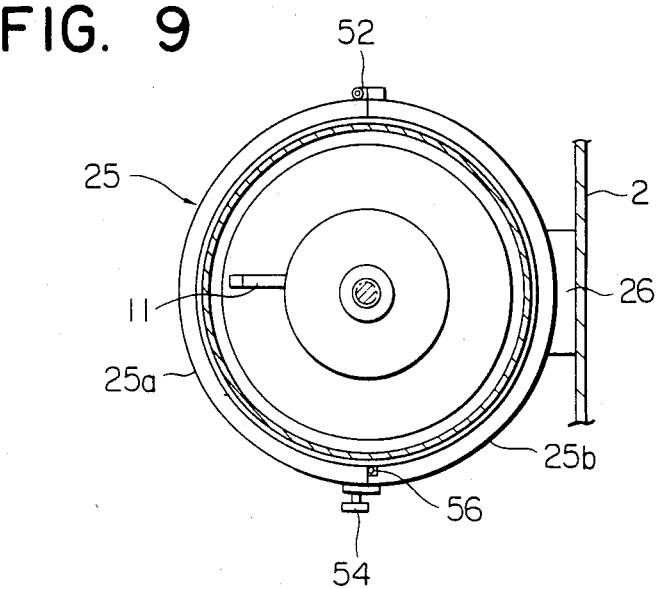
FIG. 9 is a cross-sectional view taken along the line IX—IX of FIG. 8.

The lower cover 25 is the same as that of the conventional apparatus in that it is formed by a pair of semicylindrical covers 25a, 25b one of which is a front cover 25a and the other of which is a rear cover 25b, and is fixed to the supporting frame 2 through the mounting means 26 at the rear cover 25b thereof. The lower cover 25 is different from that of the conventional apparatus in that the front cover 25a is attached to the rear cover 25b through hinges 25 to be made openable as shown in FIG. 8 with a chain line and a solid line, which front cover 25a is locked in the rear cover 25b in its closed position by a mechanism not shown in the drawings. An inward curved flange 53 is formed at upper ends of the covers 25a, 25b, which flange 53 is disposed near a flange 24' of a middle cover 24 which forms a part of the upper frame 3. Lower ends of the cover 25a, 25b are disposed near the cutting plate 13. The reference numeral 54 designates a knob for opening and closing the front cover 25a.

Figure 10:
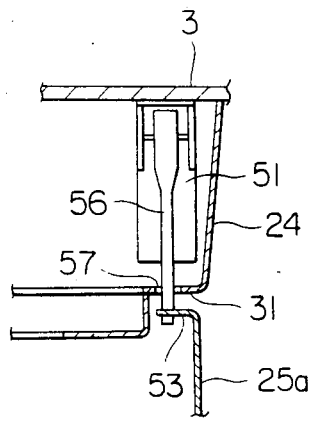
FIG. 10 is a longitudinal sectional view taken along the line X—X of FIG. 8.
Figure 11:
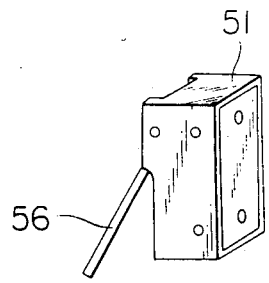
FIG. 11 is a perspective view of the sub-switch shown in FIG. 8.

A sub-switch 51, for example such as a limit switch and the like, is connected with the main switch 23 in series in the control circuit for the motor 5, which sub-switch 51 is fixed to a lower portion of the upper frame 3 above an upper portion of a free end of the front cover 25a through a mounting plate 55 and is provided with a swing lever 56 which is always biased toward a position where the sub-switch 51 is turned off as indicated by a chain line in FIG. 8. As shown in FIG. 10, a lower end of the swing lever 56 of the sub-switch 51 extends downward beyond the middle cover 24 through a through-hole 57 provided in the flange 24' thereof to engage with the flange 53 of the front cover 25a. Consequently, the sub-switch 51 is turned off when the front cover 25a is opened to bring the swing lever 56 to the position indicated by the chain line in FIG. 8. As a result, the motor 5 is not actuated even if the main switch 23 is turned on. On the other hand, in case that the front cover 25a is closed, it is possible to actuate the motor 5 by turning on the main switch 23 since the sub-switch 51 is already closed by the front cover 25a through the switch lever 56 which is brought to a position indicated by a solid line in FIG. 8 to close the sub-switch 51 when the front cover 25a is closed. In use of the apparatus of the present invention, the front cover 25a is first opened to place the food in the cutting plate 13. At this time, there is no fear to hurt the user even if the user turns on the main switch 23 by mistake, because the sub-switch 51 is already turned off by the opened front cover 25a. In case that the front cover 25a is opened in cutting operation by mistake, since the sub-switch 51 is also turned off by the front cover 25a, there is no fear to hurt the user.

Incidentally, in the above embodiment of the present invention, the sub-switch 51 is provided above the free end of the front cover 25a positioned in the position where the sub-switch 51 is turned off. However, it is possible to provide the sub-switch 51 in any position where the swing lever 56 is swung to turn on the sub-switch 51 when the front cover 25a is closed. Therefore, a position where the sub-switch 51 is provided is not restricted to that of the above embodiment.

Figure 12A:
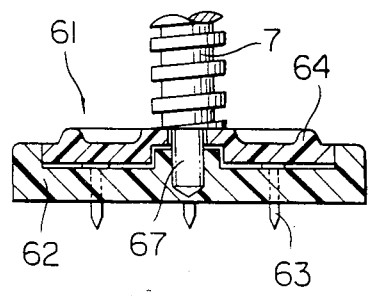
FIG. 12A is a longitudinal sectional view of a holding member of the apparatus of the present invention shown in FIG. 4.
Figure 12B:
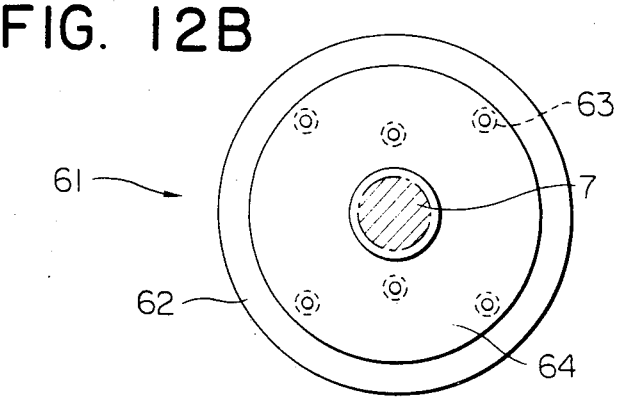
FIG. 12B is a plan view of the holding member shown in FIG. 12A.
Figure 12C:
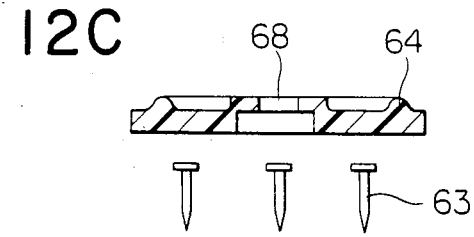
FIG. 12C is an exploded longitudinal sectional view of the holding member shown in FIG. 12A.
Figure 12C:
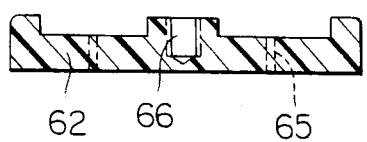

In FIGS. 12A to 12C, the details of the holding member 61 are shown. The holding member 61 is formed by a base plate 62, a plurality of holding pins 63 and a cover 64. Although both of the base plate 62 and the cover 64 are made of plastic, it is also possible to employ other suitable materials for them. The base plate 62 is provided with a plurality of small holes 65 in which the holding pins 63 are inserted and a threaded central hole 66 which is threadably engaged with the main shaft 7. The cover 64 has a through-hole 68 for passing through a threaded portion of the main shaft 7. In assembling of the holding member 61, the holding pins 63 are first inserted into the small holes 65 of the base plate 62, and then the cover 64 is fitted in an upper portion of the base plate 62. After that, the threaded portion 67 of the main shaft 7 is screwed into the threaded central hole 66 of the base plate 62 through the through-hole 68 of the cover 64 and fastened thereto. Disassembling of the holding member 61 can be performed in reverse sequence with respect to the above assembling sequence of the same. Since the holding member 61 can be easily assembled and disassembled, it is possible to wash out it in a simple manner.

The present invention has been described in detail sufficient to enable one of ordinary skill in the art to make and use the same. It is believed that certain modifications and alterations of the preferred embodiments will occur to others upon a reading and understanding of the specification, and it is intended to include all such alterations and modifications as part of the present invention, insofar as they come within the scope of the appended claims.

What is claimed is:

1. A food-cutting apparatus comprising:
a longitudinal supporting frame mounted in upright position on a base; an upper frame and a cutting plate below said upper frame both of which are fixed to a front surface of said supporting frame in lateral position; a longitudinal rotary main shaft provided on said upper frame movably up and down and provided with a holding member for a work at its lower end; a worm wheel meshing with a worm formed on said main shaft; a brake ring and a handle for moving said main shaft up and down, both of which are provided on a rotary shaft or said worm wheel; a brake shoe abutting on said brake ring for controlling a rotation of said worm wheel; a cover for enclosing a cutting operation area above said cutting plate, said cover being openable horizontally; an electric motor rotatably driving said main shaft; and a main switch provided in a control circuit for said electric motor;
characterized by further comprising:
a stop means having its front end engaging portion engage with said worm wheel, said stop means being so supported that said front end engaging portion is travelable between a first position where said engagement with said worm wheel is established and a second position where said engagement is resolved; and a supporting member for said stop means, said supporting member being disposed on said upper frame.

2. The food-cutting apparatus as set forth in claim 1, wherein: said stop means is provided with a rod which is both rotatable and slidable in a through-hole provided in said supporting member, at a front end on which rod is formed said front end engaging portion having an inclined end surface engaging with said worm wheel, behind which engaging portion is formed a flange, around which rod a coil spring is mounted between said flange and said supporting member for biasing said rod toward said worm wheel, said rod being brought into said first position or said second position where said inclined end surface is directed up or down through a rotation of said rod, behind said rod is provided a stop pin which engages with a rear surface of said supporting member in said first position or said second position.

3. The food-cutting apparatus as set forth in claim 1, wherein: said stop means is provided with a rod which is both rotatable and slidable in a through-hole provided in said supporting member, at a front end of which is formed said front end engaging portion engaging with said worm wheel, behind which engaging portion is formed a flange, around which rod a coil spring is mounted between said flange and said supporting member for biasing said rod toward said worm wheel, further which rod is provided with a pin in a rear portion thereof, which supporting member has an opening in a rear side thereof and is provided with a sleeve in which a long slit is formed in which which slit said pin is inserted.

4. The food-cutting apparatus as set forth in claim 1, wherein: at a lower end of said upper frame is provided a sub-switch on-off operation of which is performed by opening-and-closing operation of said cover, which sub-switch is connected with said main switch in series in said control circuit for said electric motor.

5. The food-cutting apparatus as set forth in claim 1, wherein: said holding member is formed by a base plate, a plurality of holding pins and a cover, which base plate is provided with a plurality of through-holes in which said plurality of holding pins are inserted.

* * * * *